US009920740B2

(12) United States Patent
Enevoldsen et al.

(10) Patent No.: US 9,920,740 B2
(45) Date of Patent: Mar. 20, 2018

(54) WIND TURBINE ROTOR BLADE ELEMENT AND WIND TURBINE ROTOR BLADE

(75) Inventors: Peder Bay Enevoldsen, Vejle (DK); Jens Jørgen Østergaard Kristensen, Nibe (DK); Jason Stege, Brande (DK); Carsten Thrue, Braedstrup (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 1532 days.

(21) Appl. No.: 13/352,627

(22) Filed: Jan. 18, 2012

(65) Prior Publication Data

US 2012/0189455 A1    Jul. 26, 2012

(30) Foreign Application Priority Data

Jan. 24, 2011    (EP) ...................................... 11151803

(51) Int. Cl.
*F03D 1/06* (2006.01)
*F03D 7/02* (2006.01)

(52) U.S. Cl.
CPC ......... *F03D 1/0641* (2013.01); *F03D 7/0232* (2013.01); *F05B 2240/301* (2013.01); *Y02E 10/721* (2013.01); *Y02E 10/723* (2013.01)

(58) Field of Classification Search
CPC . F03D 1/0641; F03D 7/0232; F05B 2240/301
USPC .......... 416/62, 228, 231 B, 235, 236 R, 237
See application file for complete search history.

(56) References Cited

U.S. PATENT DOCUMENTS

| 4,813,633 A * | 3/1989 | Werle et al. .................. 244/130 |
| 7,293,959 B2 * | 11/2007 | Pedersen et al. ............... 416/23 |
| 2006/0018759 A1 | 1/2006 | Moser |
| 2007/0003403 A1 | 1/2007 | Pedersen et al. |
| 2009/0274559 A1 | 11/2009 | Bendel |
| 2010/0028161 A1 * | 2/2010 | Vronsky et al. .............. 416/238 |
| 2012/0195764 A1 * | 8/2012 | Fuglsang et al. ......... 416/223 R |

FOREIGN PATENT DOCUMENTS

| DE | 19964114 A1 * | 7/2001 |
| DE | 102008026474 A1 | 12/2009 |
| EP | 1845258 A1 | 10/2007 |
| EP | 1995455 A1 | 11/2008 |
| JP | S56126698 A | 10/1981 |
| JP | 2002079996 A | 3/2002 |
| JP | 2003269320 A | 9/2003 |
| WO | WO 2004097215 A1 | 11/2004 |
| WO | WO 2007118581 A1 | 10/2007 |
| WO | WO 2010066501 A1 | 6/2010 |
| WO | WO 2011042527 A1 | 4/2011 |

OTHER PUBLICATIONS

Communication from European Patent Office stating cited references, dated Jun. 21, 2011, pp. 1-5.

* cited by examiner

*Primary Examiner* — Logan Kraft
*Assistant Examiner* — Danielle M Christensen

(57) ABSTRACT

A wind turbine rotor blade element includes a first portion and a second portion connected to each other is described. The first portion includes a rear surface for facing a surface of a wind turbine rotor blade and the second portion includes a top surface which includes an angle between 90° and 180° with the rear surface of the first portion.

12 Claims, 5 Drawing Sheets

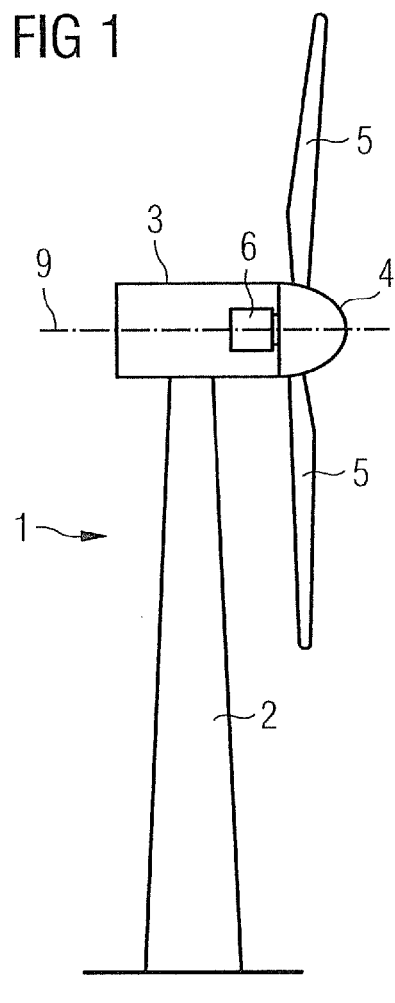
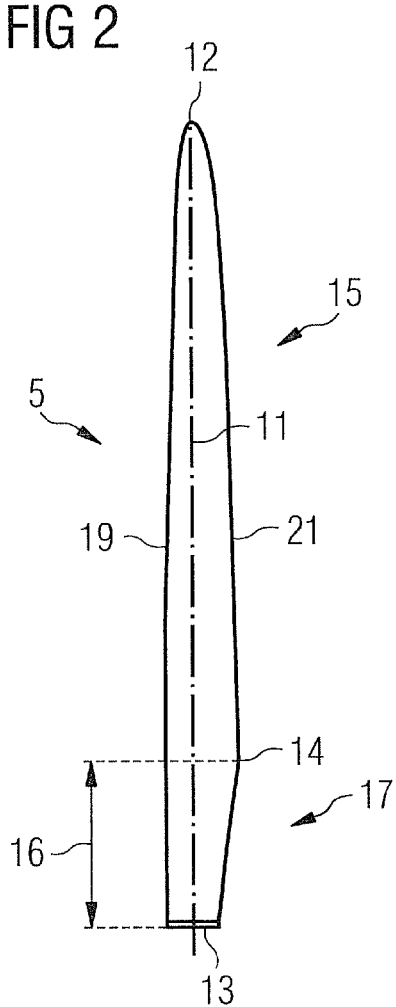
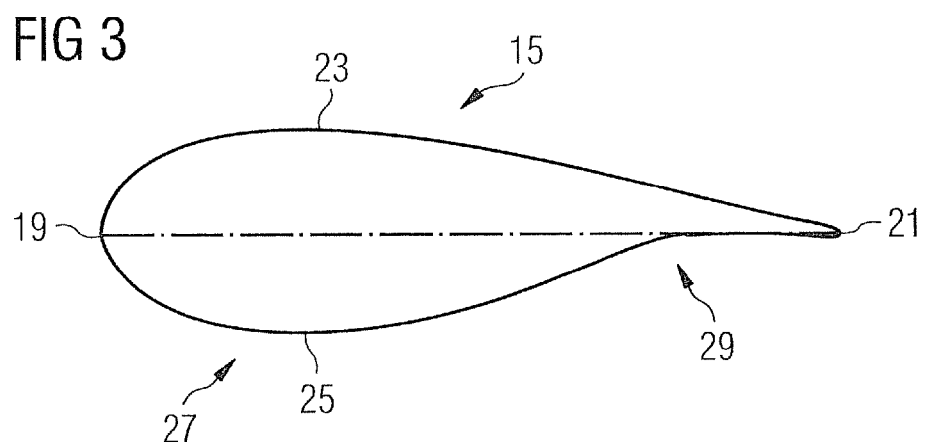

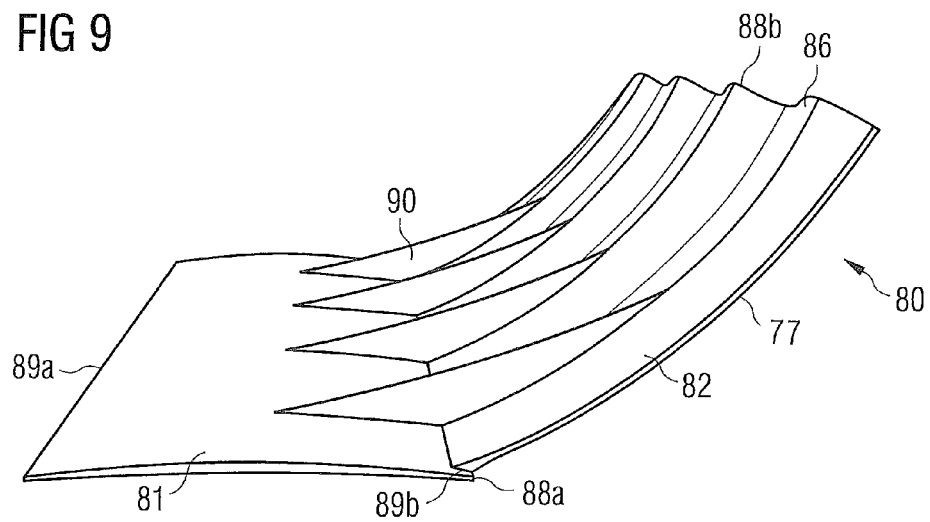
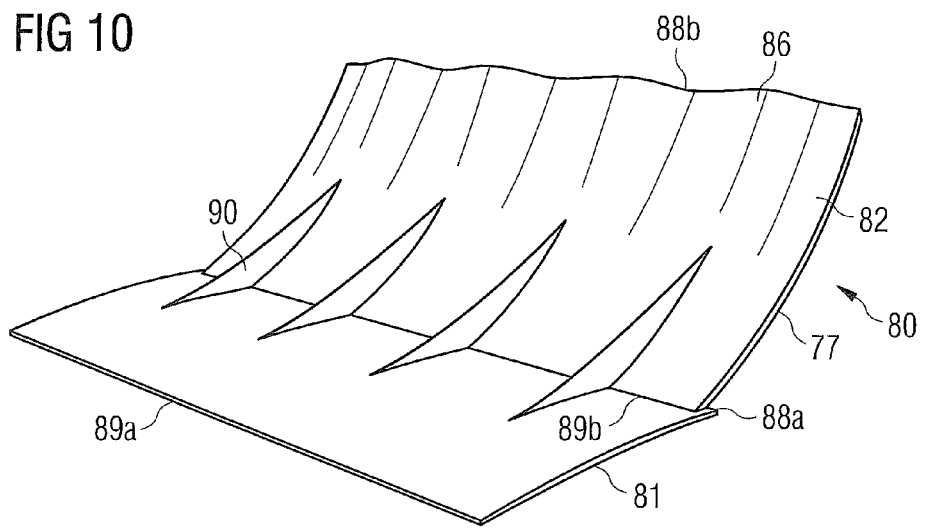

WIND TURBINE ROTOR BLADE ELEMENT AND WIND TURBINE ROTOR BLADE

CROSS REFERENCE TO RELATED APPLICATIONS

This application claims priority of European Patent Office application No. 11151803.1 EP filed Jan. 24, 2011. All of the applications are incorporated by reference herein in their entirety.

FIELD OF INVENTION

The present invention relates to a wind turbine rotor blade element and to a wind turbine rotor blade with advantageous aerodynamic properties.

BACKGROUND OF INVENTION

It is widely known from prior art literature now that alternating the profile of a wind turbine rotor blade, also changes its aerodynamic characteristics. For a rotor blade also adding spoilers/Gurney flaps to the surface of the blade enhances the characteristics. Examples hereof are:

WO 2010/066501 A discloses a wind turbine rotor blade with a flow guiding device attached on a pressure side of the blade. The flow surface is formed so that for each transverse cross-section, end point tangent to the inflow surface at the endpoint crosses the profiled contour at a crossing point, where the profiled contour has a profile tangent to the profiled contour, and so that an angle between the profile tangent and the end point tangent is at least 45 degrees.

WO 2007/118581 A discloses a rotor blade where the inboard part of the blade is provided with a flow guiding device on the pressure side of the blade in order to delay separation of the airflow and increasing the aerodynamic performance of the blade.

WO 2004/097215 A discloses various solutions for changing the aerodynamic properties at the trailing edge of a rotor blade by alternating the trailing edge profile.

EP 1 845 258 A discloses a rotor blade having a Gurney flap device arranged in the transition portion of the rotor blade. The flap device has a concave curvature and is arranged at the trailing edge on the pressure side of the blade.

SUMMARY OF INVENTION

It is a first objective of the present invention to provide a wind turbine rotor blade element which can be attached to a wind turbine rotor blade and which increases the aerodynamic properties of the wind turbine rotor blade. It is a second objective of the present invention to provide a wind turbine rotor blade with increased aerodynamic properties.

Objectives are solved by a wind turbine rotor blade element and a wind turbine rotor blade as claimed in the independent claims. The depending claims define further developments of the invention. All described features are advantageous individually or in any combination with each other.

The inventive wind turbine rotor blade element comprises a first portion and a second portion. The first portion and the second portion are connected with each other. The first portion comprises a rear surface for facing a surface of a wind turbine rotor blade. The second portion comprises a top surface which includes an angle between 90° and 180°, preferably between 110° and 160°, with the rear surface of the first portion. Furthermore, the first portion can comprise a top surface which includes an angle between 90° and 180°, preferably between 110° and 160°, with the top surface of the second portion.

In case that the rear surface or the top surface of the first and/or second portion comprises a curvature, the angle between the first portion and the second portion can be determined as the angle between a tangent at the rear surface or top surface of the first portion and the top surface or a tangent at the top surface of the second portion. Alternatively, a plane connecting a front edge with a rear edge of the first or second portion can be defined as reference plane to determine the angle between the top surface of the second portion and the rear surface or the top surface of the first portion.

The inventive blade element can advantageously be attached to a wind turbine rotor blade, preferably to the trailing edge of the wind turbine rotor blade, in order to improve the energy capturing characteristics of the blade. Using the inventive blade element the aerodynamic properties of a wind turbine rotor blade can be increased.

The inventive wind turbine rotor blade element may be a spoiler, a flow guiding device or a flap. The first portion may be prepared for attachment. The second portion may arise from the first portion or from the curvature of the surface of the blade at a particular angle. Preferably the first portion is of sufficient size so that the blade element can be securely secured to the surface of the blade. It may be secured by e.g. double sided adhesive tape and/or a structural adhesive and/or screws and/or bolts and threaded holes etc. Furthermore the first portion may have a curvature so that it accurately follows the surface curvature of the blade at the installation position. Consequently a blade may be attached with various blade elements or members of blade elements which are not of the same curvature.

The second portion is the one which influences the aerodynamic characteristics of the total rotor blade. As previously mentioned, the second portion arises from the curvature of the blade at some angle. For various blade elements or members of blade elements, the shape of the second portion, dimensions as well as the said angle may be different from other blade elements or members of blade elements installed on the same rotor blade.

Advantageously, the first portion and the second portion can be made in one piece. Alternatively, the first portion and the second portion can be separate elements which are connected to each other. Moreover, the wind turbine rotor blade element may comprise a transition portion which is located between the first portion and the second portion. Generally, the inventive wind turbine rotor blade element may be made by injection moulded thermo-plastics, vacuum moulded thermo-plastics, moulded structural plastics, glasfibre reinforced plastics (GRP) etc.

The wind turbine rotor blade element can comprise a number of wedges which are connected to the first portion and to the second portion. The wedges may support the angle between the first portion and the second portion. This increases the stability of the rotor blade element under varying aerodynamic load conditions.

Advantageously, the second portion and/or the transition portion may comprise a number of corrugations. Such corrugations increase the stiffness of the construction whereby the rotor blade element can be made in a thinner material.

For a rotor blade element comprising wedges, the level of corrugation of the structure of the second portion and/or the transition portion can be decreased or alternatively the rotor blade element can be made without corrugation.

Preferably, the rear surface of the first portion can comprise a curvature corresponding to a curvature of a surface portion of a particular wind turbine rotor blade. This has the advantage, that the rotor blade element exactly fits onto the surface of the rotor blade and accurately follows the surface curvature of the blade at the installation position.

Moreover, the wind turbine rotor blade element comprises a number of rotor blade element members, each member comprising part of the first portion and part of the second portion. This means that the rotor blade element can be installed by aligning a number of rotor blade element members in span direction of a rotor blade along the surface of the rotor blade. Aligning and attaching the rotor blade element members to the surface of a wind turbine rotor blade provides for an easy installation of the rotor blade element at the rotor blade.

For one method of manufacturing the inventive blade element members, the members may be made from a longer piece of, for example a moulded, blade element which in turn is cut into suitable lengths.

The inventive wind turbine rotor blade comprises a wind turbine rotor blade element as previously described. Generally, the inventive rotor blade has the same advantages as the inventive wind turbine rotor blade element.

The wind turbine rotor blade element is connected to the rotor blade such that the rear surface of the first portion faces a surface of the rotor blade. For example, the wind turbine rotor blade element can be connected to the rotor blade by a double sided adhesive tape and/or a structural adhesive and/or screws and/or bolts and threaded holes.

Preferably, the rear surface of the first portion of the wind turbine rotor blade element may have a curvature so that it follows the surface curvature of the blade at the position where the wind turbine rotor blade element is connected to the rotor blade.

The rotor blade may comprise a span direction, a root portion and a shoulder. Advantageously, the wind turbine rotor blade element is connected to the rotor blade between the root portion and the shoulder in span direction. This means, that the rotor blade element may be located at a distance from the root portion which is less than the distance between the root portion and the shoulder.

Furthermore, the rotor blade can comprise a trailing edge and the wind turbine rotor blade element may be connected to the rotor blade at the trailing edge.

The invention is advantageous in that the rotor blade element enhances the aerodynamic properties of the rotor blade and in turn ensures a higher energy production.

Furthermore as the rotor blade element is segmented in a plurality of members, the invention is advantageous in that it is easy to install, both from a factory side and as a retrofit on-site on already installed rotor blades.

Even further as the members are relatively small in size, the invention is advantageous in that if e.g. one member should be de-attached from the blade, the impact of such member falling to the ground is smaller compared to larger spoilers.

The corrugated construction of the members is advantageous in that it ensures a strong and stiff construction with only relative little material.

BRIEF DESCRIPTION OF THE DRAWINGS

Further features, properties and advantages of the present invention will become clear from the following description of an embodiment in conjunction with the accompanying drawings. All mentioned features are advantageous separate or in any combination with each other.

FIG. 1 schematically shows a wind turbine.

FIG. 2 schematically shows a rotor blade in a plan view on the plane defined by the blade's span and the blade's chord.

FIG. 3 schematically shows a chordwise section through the airfoil portion of the blade shown in FIG. 2.

FIG. 9 schematically shows a further variant of an inventive wind turbine rotor blade element in a perspective view.

FIG. 10 schematically show the rotor blade element of FIG. 9 in a further perspective view.

DETAILED DESCRIPTION OF INVENTION

Figure 4:
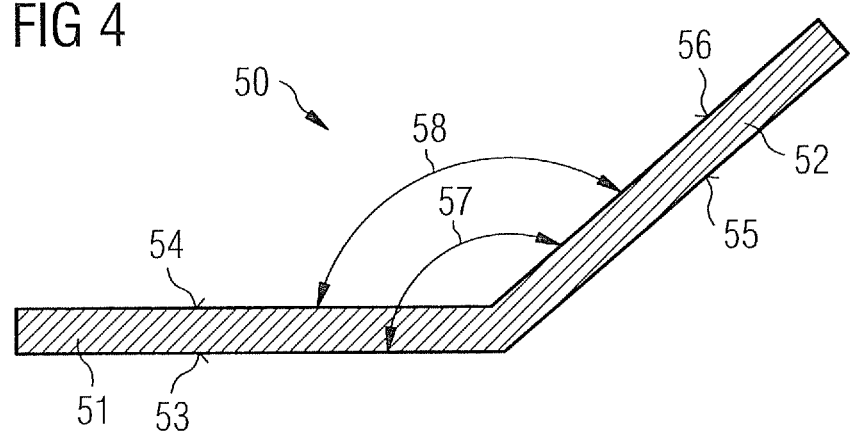
FIG. 4 schematically shows an inventive wind turbine rotor blade element in a sectional view.

FIG. 1 schematically shows a wind turbine 1. The wind turbine 1 comprises a tower 2, a nacelle 3 and a hub 4. The nacelle 3 is located on top of the tower 2. The hub 4 comprises a number of wind turbine blades 5. The hub 4 is mounted to the nacelle 3. Moreover, the hub 4 is pivot-mounted such that it is able to rotate about a rotation axis 9. A generator 6 is located inside the nacelle 3. The wind turbine 1 is a direct drive wind turbine.

FIG. 2 shows a wind turbine blade 5 as it is usually used in a three-blade rotor. However, the present invention shall not be limited to blades for three-blade rotors. In fact, it may as well be implemented in other rotors, e.g. one-blade rotors or two-blade rotors.

The rotor blade 5 shown in FIG. 2 comprises a root portion 13 with a cylindrical profile and a tip 12. The tip 12 forms the outermost part of the blade 5. The cylindrical profile of the root portion 13 serves to fix the blade 5 to a bearing of a rotor hub 4. The rotor blade 5 further comprises a so-called shoulder 14 which is defined as the location of its maximum profile depth, i.e. the maximum chord length of the blade 5. Between the shoulder 14 and the tip 12 an airfoil portion 15 extends which has an aerodynamically shaped profile. Between the shoulder 14 and the cylindrical root portion 13, a transition portion 17 extends in which a transition takes place from the aerodynamic profile of the airfoil portion 15 to the cylindrical profile of the root portion 13.

The span of the blade 5 is designated by reference numeral 11. The distance between the shoulder 14 and the root portion 13 in span direction is designated by reference numeral 16. The inventive rotor blade element is preferably located at the rotor blade between the root portion and the shoulder in span direction. This means that the distance between the rotor blade element and the root 13 in span direction is less than the distance between the shoulder 14 and the root 13 in span direction.

A chord-wise cross section through the rotor blade's airfoil section 15 is shown in FIG. 3. The aerodynamic profile shown in FIG. 3 comprises a convex suction side 23 and a less convex pressure side 25. The dash-dotted line extending from the blade's leading edge 19 to its trailing edge 21 shows the chord of the profile. Although the pressure side 25 comprises a convex section 27 and a concave section 29 in FIG. 3, it may also be implemented without a concave section at all as long as the suction side 23 is more convex than the pressure side 25.

The suction side 23 and the pressure side 25 in the airfoil portion 15 will also be referred to as the suction side and the pressure side of the rotor blade 5, respectively, although, strictly spoken, the cylindrical portion 13 of the blade 5 does not show a pressure or a suction side.

FIG. 4 schematically shows an inventive wind turbine rotor blade element 50 in a sectional view. The blade element 50 comprises a first portion 51 and a second portion 52. The first portion 51 comprises a top surface 54 and a rear surface 53. The second portion 52 comprises a top surface 56 and a rear surface 55.

When the blade element is connected to a wind turbine rotor blade, then the rear surface 53 of the first portion 51 faces the surface of the wind turbine rotor blade 5.

The top surface 56 of the second portion includes an angle 57 between 90° and 180°, preferably between 110° and 160°, with the rear surface 53 of the first portion 51. Furthermore, the top surface 56 of the second portion 52 includes an angle 58 between 90° and 180°, preferably between 110° and 160, with the top surface 54 of the first portion 51.

In FIG. 4 the first portion 51 and the second portion 52 are made in one piece or are integrally formed. Alternatively, the first portion 51 and the second portion 52 can be separate elements which are connected to each other.

Figure 5:
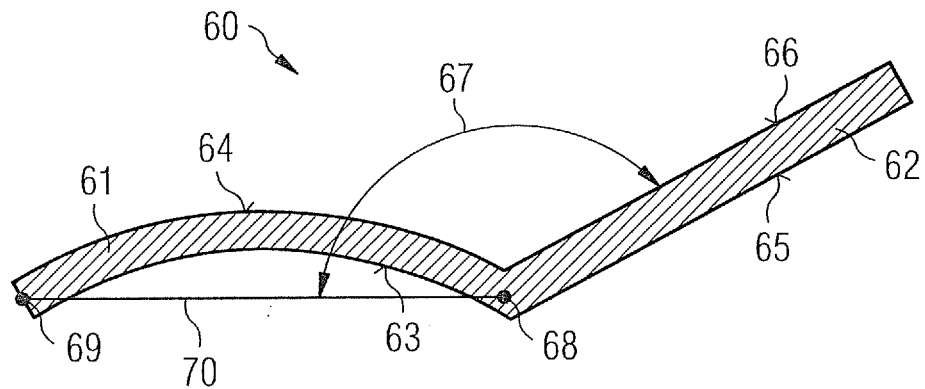
FIG. 5 schematically shows a variation of an inventive wind turbine rotor blade element in a sectional view.

FIG. 5 schematically shows a variation of an inventive wind turbine rotor blade element 60 in a sectional view. The blade element 60 comprises a first portion 61 with a top surface 64 and a rear surface 63. It further comprises a second portion 62 with a top surface 66 and a rear surface 65.

The rear surface 63 comprises a curvature which corresponds to the curvature of a wind turbine rotor blade surface. The first portion 61 comprises a front edge 68 and a rear edge 69. The second portion 62 is connected to the first portion 61 at the front edge 68. In case that the blade element 60 is made in one piece, the front edge 68 is located at the transition between the first portion 61 and the second portion 62.

The front edge 68 and the rear edge 69 define a plane 70 that connects the front edge 68 with the rear edge 69. In case of a curvature of the rear surface 63 of a first portion, the top surface 66 of the second portion includes an angle 67 between 90° and 180°, preferably between 110° and 160°, with the plane 70. In this case, the plane 70 is regarded as rear surface 63 to determine a precise angle between the rear surface 63 of the first portion 61 and the top surface 66 of a second portion 62.

Figure 6:
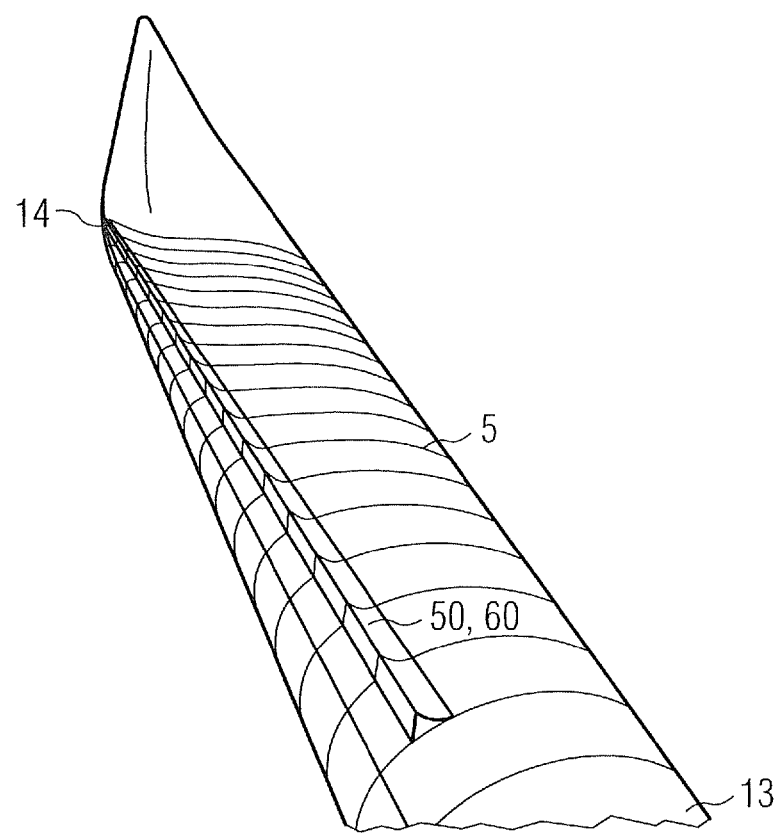
FIG. 6 schematically shows part of a wind turbine rotor blade in a perspective view.

FIG. 6 schematically shows part of a wind turbine rotor blade 5 in a perspective view. The wind turbine rotor blade 5 comprises an inventive blade element 50, 60. The blade element 50, 60 is connected to the surface of the rotor blade 5 between the shoulder 14 and the root portion 13 of the blade 5. The blade element 50, 60 is located close to the trailing edge 21a of the rotor blade 5 and extends in span direction.

Figure 7:
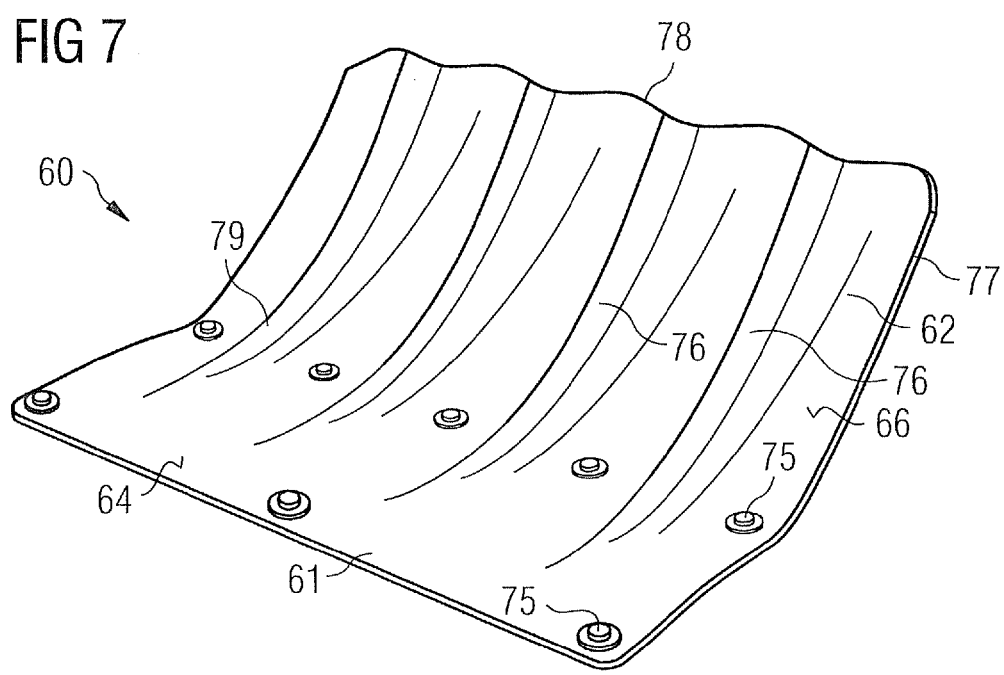
FIG. 7 schematically shows the blade element in a perspective view.

FIG. 7 schematically shows the blade element 60 in a perspective view. The first portion 61 comprises a number of screws 75 for connecting the blade element 60 to the surface of a wind turbine rotor blade 5. A transition portion 79 is located between the first portion 61 and the second portion 62 defining the transition between the first portion 61 and the second portion 62.

The second portion 62 comprises a side edge 77 and a front edge 78. The transition portion 79 and the second portion 62 comprise a number of corrugations 76. The corrugations 76 are formed such that they run parallel to the side edge 77 of the second portion 62. Moreover, the corrugations 76 are formed such that they give the front edge 78 of the second portion 62 a wave-like shape.

Figure 8:
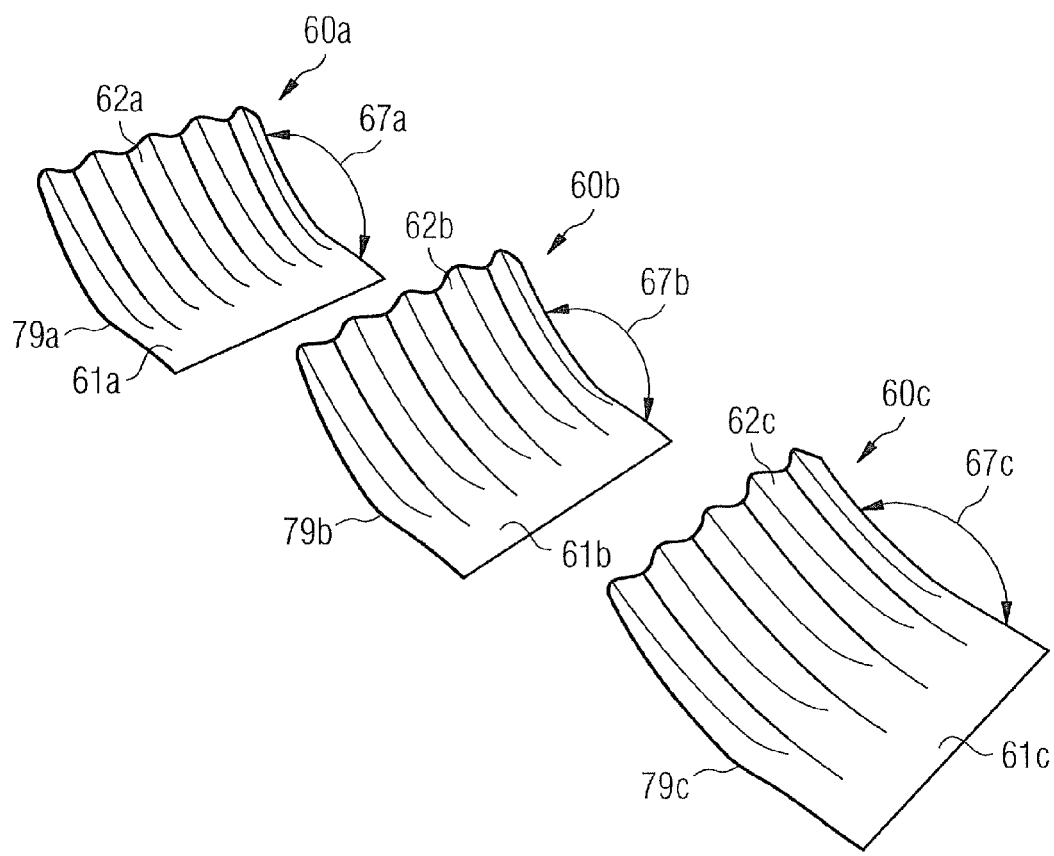
FIG. 8 schematically shows three different variations of rotor blade elements or rotor blade element members in a perspective view.

FIG. 8 schematically shows three different variations of rotor blade elements or rotor blade element members 60a, 60b and 60c in a perspective view. The blade members 60a, 60b and 60c can be attached at three different positions of a blade 5. The three different blade element members 60a, 60b and 60c differ from each other in the angle between the first portion 61 (or more precisely the rear surface of the first portion 61) and the second portion 62 (or more precisely the top surface of the second portion 62). The angle 67a of the first blade element member 60a is smaller than the angle 67b of the second blade element member 60b. The angle 67b is smaller than the angle 67c of the third blade element member 60c.

FIG. 9 and FIG. 10 schematically show a further variant of an inventive wind turbine rotor blade element 80 in a perspective view. The blade element 80 comprises a first portion 81 and a second portion 82. The first portion 81 comprises a front edge 88a and a rear edge 89a. The second portion 82 comprises a front edge 88b and a rear edge 89b. The first portion 81 and the second portion 82 are connected to each other at the rear edge 89b of the second portion 82 and the front edge 88a of the first portion 81.

The rotor blade element member 80 comprises a number of wedges 90 to support the angle between the first portion 81 and the second portion 82 under varying aerodynamic load conditions. For such blade element construction comprising wedges 90, the level of corrugation 86 of the second portion 82 may be degreased or alternatively the second portion 82 may be made without corrugation 86.

Generally, the blade elements 50, 60, 80 can be regarded as blade element members or can be regarded as part of a blade element. For one method of manufacturing the blade element members, the members may be made from a longer piece of a moulded blade element which in turn is cut into suitable length forming the blade element members.

While the invention has been described in terms of a certain preferred embodiment and suggested possible modifications thereto, other embodiments and modifications apparent to those of ordinary skill in the art are also within the scope of this invention without departure from the spirit and scope of this invention. Thus, the scope of the invention should be determined based upon the appended claims and their legal equivalents, rather than the specific embodiments described above.

The invention claimed is:

1. A wind turbine rotor blade element, comprising:
   a first portion comprising a rear surface for facing a surface of a wind turbine rotor blade; and
   a second portion connected to the first portion, the second portion comprising a top surface arranged at an angle between 90° and 180° with respect to the rear surface of the first portion,
   a transition portion arranged between the first portion and the second portion, the transition portion comprising a plurality of corrugations, and wherein the first portion comprises a top surface which is arranged at an angle between 90° and 180° with respect to the top surface of the second portion.

2. The wind turbine rotor blade element as claimed in claim 1,
wherein the top surface of the second portion is arranged at an angle between 110° and 160° with respect to the rear surface or with respect to the top surface of the first portion.

3. The wind turbine rotor blade element as claimed in claim 1,
wherein the first portion and the second portion are made in one piece.

4. The wind turbine rotor blade element as claimed in claim 1,
further comprises a plurality of wedges which are connected to the first portion and to the second portion.

5. The wind turbine rotor blade element as claimed in claim 1,
wherein the second portion and the transition portion comprises a plurality of corrugations.

6. The wind turbine rotor blade element as claimed in claim 1,
wherein the rear surface of the first portion comprises a curvature corresponding to a curvature of a surface portion of a particular wind turbine rotor blade.

7. The wind turbine rotor blade element as claimed in claim 1,
further comprising a plurality of rotor blade element members, each member comprising part of the first portion and part of the second portion.

8. A wind turbine rotor blade comprising:
a span direction;
a root portion; and
a shoulder; and
a wind turbine rotor blade element as claimed in claim 1,
wherein the wind turbine rotor blade element is connected to the blade such that the rear surface of the first portion faces a surface of the blade
wherein the wind turbine rotor blade element is connected to the rotor blade between the root portion and the shoulder in span direction.

9. The wind turbine rotor blade as claimed in claim 8,
wherein the wind turbine rotor blade element is connected to the blade by a double sided adhesive tape and/or a structural adhesive and/or screws and/or bolts and threaded holes.

10. The wind turbine rotor blade as claimed in claim 8,
wherein the rear surface of the first portion of the wind turbine rotor blade element has a curvature so that it follows the surface curvature of the blade at the position where the wind turbine rotor blade element is connected to the rotor blade.

11. The wind turbine rotor blade as claimed in claim 8,
further comprising a trailing edge; and
wherein the wind turbine rotor blade element is connected to the rotor blade at the trailing edge.

12. The wind turbine rotor blade as claimed in claim 8,
further comprising a trailing edge; and
wherein the wind turbine rotor blade element is connected to the rotor blade at the trailing edge.

* * * * *